United States Patent
Bruce

[11] Patent Number: 5,274,988
[45] Date of Patent: Jan. 4, 1994

[54] LAWN MOWER COVER

[76] Inventor: David Bruce, R.R. 02 Box 119, Owenton, Ky. 40359-9607

[21] Appl. No.: 889,252

[22] Filed: May 28, 1992

[51] Int. Cl.⁵ .............................................. A01D 34/82
[52] U.S. Cl. ...................................... 56/17.4; 56/320.1; 150/157
[58] Field of Search ................... 56/17.4, 320.1, 320.2, 56/DIG. 9, DIG. 20, DIG. 24; 150/157, 166, 154

[56] References Cited

U.S. PATENT DOCUMENTS

| | | | |
|---|---|---|---|
| D. 260,149 | 8/1981 | Harris | D15/17 |
| 3,087,585 | 4/1963 | Knuth et al. | |
| 3,667,199 | 6/1972 | Bloom | 56/320.2 |
| 4,178,977 | 12/1979 | Sur et al. | 56/320.1 |
| 4,930,298 | 6/1990 | Zenner | 56/17.4 |
| 5,101,617 | 4/1992 | Hare et al. | 56/320.1 X |

Primary Examiner—Terry Lee Melius
Attorney, Agent, or Firm—Sughrue, Mion, Zinn, Macpeak & Seas

[57] ABSTRACT

A lawn mower cover is provided which is simple in design and inexpensive but which effectively protects the lawn mower from the elements. The cover is tub-like, lower edges of the cover resting on the lawn mower deck and an upper portion of the cover being provided with a fastening cord fixture portion for attaching an elastic cord, opposite ends of the cord being fastened to the underside of the lawn mower deck. A slot is provided on the cover to accommodate the motor crank rope and controls. The lawn mower cover is preferably formed from a plastic material, such as polyethylene, and is therefore lightweight and inexpensive.

10 Claims, 2 Drawing Sheets

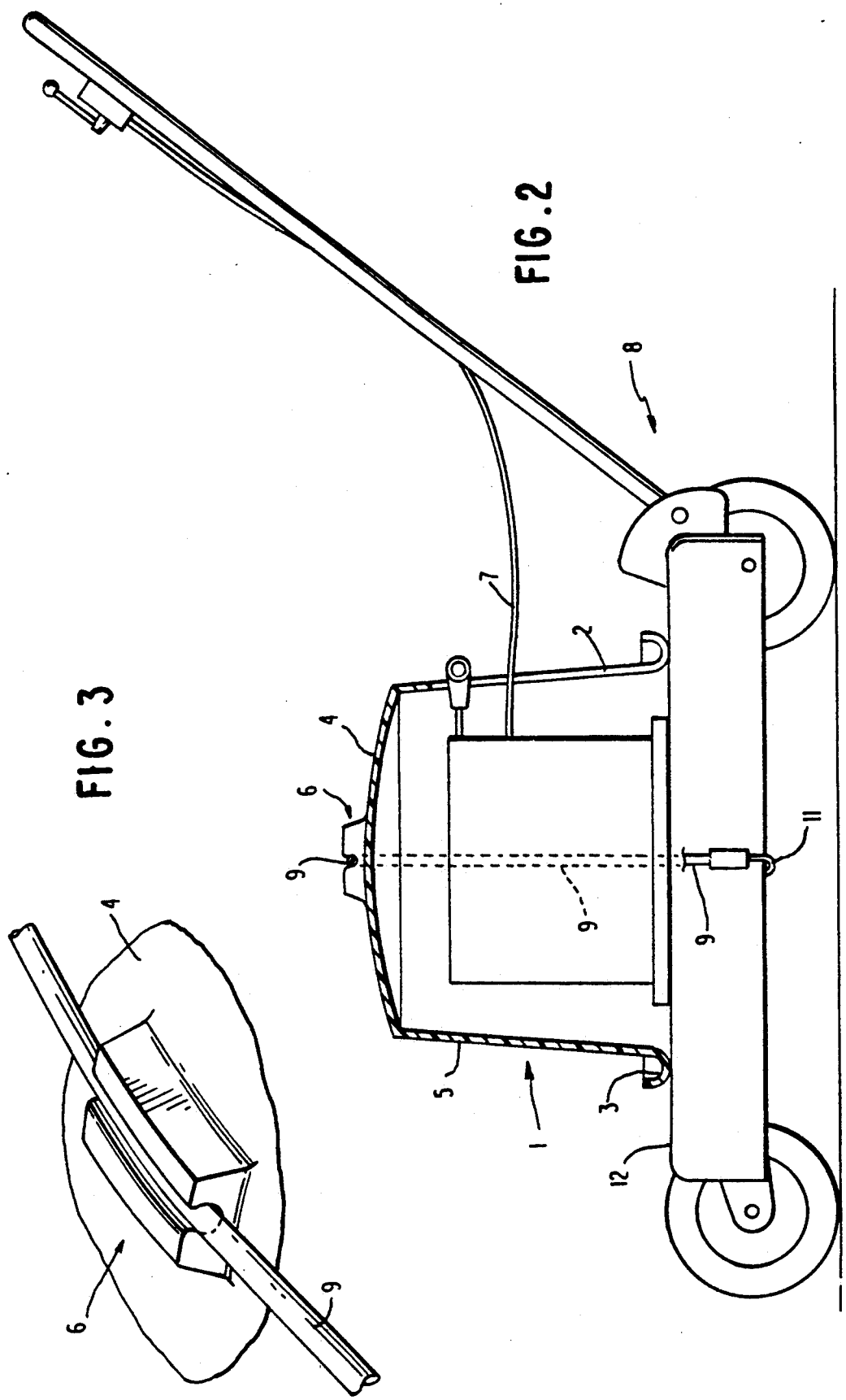

LAWN MOWER COVER

FIELD OF THE INVENTION

The present invention relates to a lawn mower cover and, more particularly, to a lawn mower cover for covering the motor of a push-type lawn mower.

BACKGROUND OF THE INVENTION

Conventional covers, such as the ones described in U.S. Pat. No. 3,087,585 and U.S. Des. Pat. No. 260,149, are designed to cover the entire mower, lower edges of the cover being supported by the ground rather than the mower. These conventional type covers are simply placed in position, over the lawn mower, after the lawn mower has been moved to a permanent storage position or temporary resting place. However, the lawn mower is not easily moved (e.g., during transport) after the lawn mower has been covered since the cover contacts the ground.

In a different type of conventional lawn mower cover, such as the one described in U.S. Pat. No. 4,178,977, the cover extends just below the bottom of the lawn mower deck and is provided with an inwardly projecting lower edge which fits under the deck for securing the cover to the deck. Means for magnetically securing the cover to the lawn mower are also provided, including an inflatable tube on which the magnetic means are secured. In removing the cover, the tube is inflated to break the force of magnetic attraction thereby releasing the cover. Thus, the mower may be transported with the protective cover in place. Nonetheless, construction of the cover, particularly with respect to the magnetic means, is complicated and expensive to produce. Furthermore, since the magnets are subjected to a relatively severe working environment, they consequently may be broken, fouled or demagnetized.

U.S. Pat. No. 4,930,298 relates to a cutting cover for use with a harvesting device. Again, the cover is complex in design and must be both mechanically and magnetically secured to the deck of the mower. Furthermore, unlike the present invention, the cover is intended to remain in place during the cutting operation.

The present invention is intended to overcome the above described limitations and, in particular, e is directed to a cover having a simple, cost effective design, and which is easily yet effectively secured to a lawn mower such that the lawn mower may be transported with the cover in place.

SUMMARY OF THE INVENTION

The present invention is directed to a lawn mower cover and, more particularly, to a tub-like cover which is secured over the motor of a push-type lawn mower, a lower peripheral edge of the cover resting on the deck surrounding the motor. The cover is preferably formed from a plastic material, such as polyethylene, and is preferably provided with a fastening cord fixture on a top portion thereof for securing an elastic cord, such as a conventional type bungee cord (e.g., as used to secure luggage to a car rack), opposite ends of the cord being provided with J-hooks to be secured to the underside of the lawn mower deck.

The cover, preferably having tapered sides for easy storage and display, may further be provided with a drainage lip around a lower peripheral edge thereof for collecting excess runoff of rain and debris, and a spout for channeling the runoff away from the motor and other sensitive machinery.

The cover may further be provided with a slot positioned to accommodate an engine crank rope and/or control cables such that the cover may be securely fastened to the deck of the lawn mower.

The preferred embodiment is best described with additional reference to the appended drawings wherein:

BRIEF DESCRIPTION OF THE DRAWINGS

FIG. 2 is a cross sectional view of the cover assembly and mower taken along the center line A—A in FIG. 1.

FIG. 3 is a perspective view of the cover shown in FIGS. 1 and 2 taken from above the fastening cord fixture.

DETAILED DESCRIPTION OF THE PREFERRED EMBODIMENT

Figure 1:
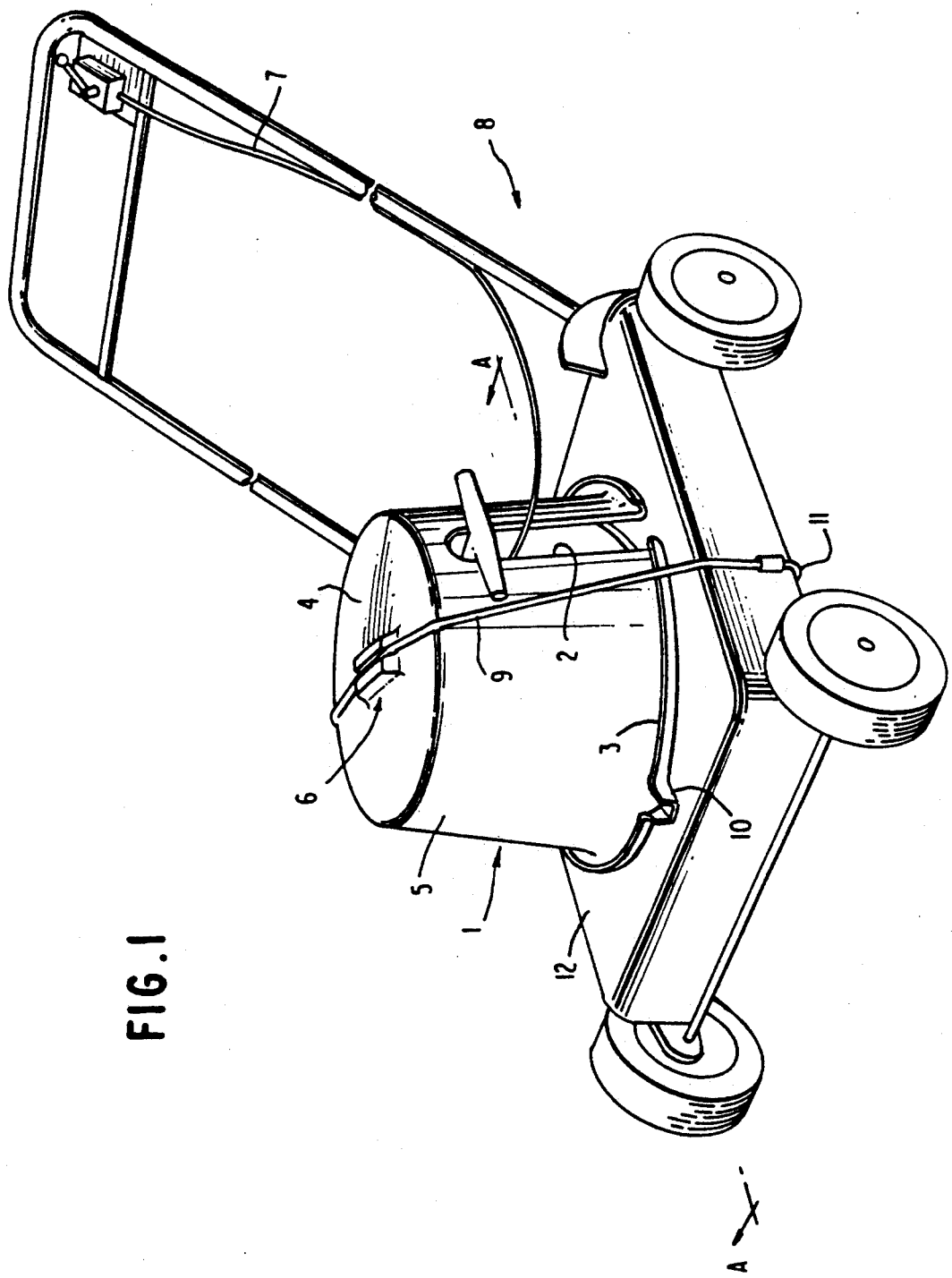
FIG. 1 is a perspective view of a preferred embodiment of the cover assembly as it would appear when secured in place on the deck of a push-type lawn mower.

FIG. 1 shows the inventive cover 1 in place on the deck 12 of a conventional push-type lawn mower 8. The cover 1, preferably formed of a plastic material such as polyethylene, has an arched top 4 to prevent the collection of rain or debris. Furthermore, the walls 5 are slanted to minimize the size of the cover 1 for easier storage and display.

A slot 2 is provided along one side of the cover 1 for accommodating the engine crank rope and/or controls 7. The cover 1 may be rotated to the proper position depending on the particular lawn mower 8 being used and the location of the crank rope and controls 7.

A drainage lip 3 forms the lower edge of the cover 1 and is constructed to collect rain or debris and to direct the runoff away from the motor and other sensitive machinery via a spout 10.

A fastening cord fixture 6 is attached, or preferably is integrally formed, to the top of the cover for accommodating an elastic cord 9, opposite ends of which are provided with hooks 11 (see FIG. 2) for securing the cord to the lower edge of the lawn mower deck 12.

FIG. 2 is a cross sectional view from one side of the lawn mower and cover taken along line A—A in FIG. 1 for showing the arched surface of the top portion 4 of the cover 1.

FIG. 3 is a perspective view from above the cover 1 for showing the fastening cord fixture 6 in more detail. In particular, the fastening cord fixture 6 is formed from a raised portion having a longitudinal slot and opening portion for accepting and securing the elastic fastening cord 9.

While a preferred embodiment has been shown and described, various other changes and modifications may be made without departing from the scope and spirit of the invention. For example, different type fasteners may be used to secure the elastic fastening cord to the cover and to the deck. Furthermore, the cover may be shaped in a variety of configurations to achieve the same desired effects.

I claim:

1. A lawn mower cover comprising:
    a cover for covering a motor of a lawn mower, said cover having a drainage lip forming a lower edge of said cover for collecting runoff and a spout for directing said runoff away from said lawn mower;

a cord for securing said cover to said lawn mower; and a fastening cord fixture secured to said cover for accepting and securing said cord.

2. A lawn mower cover as recited in claim 1, wherein said cover includes:

a fastening cord fixture secured to said cover for accepting and securing said cord.

3. A lawn mower cover as recited in claim 2, wherein said fastening cord fixture is integrally formed with said cover.

4. A lawn mower cover as recited in claim 1, wherein said cover includes an opening portion for accommodating controls and an engine crank rope of said lawn mower.

5. A lawn mower cover as recited in claim 1, wherein said cover has an arched top surface and tapered sides.

6. A lawn mower cover as recited in claim 1, wherein said drainage lip and said spout are integrally formed with said cover.

7. A lawn mower cover as recited in claim 1, wherein said cord is elastic and has J-shaped hooks at opposite ends thereof.

8. A lawn mower cover as recited in claim 1, wherein said cover is made of a plastic material.

9. A lawn mower cover as recited in claim 8 wherein said plastic material is polyethylene.

10. A lawn mower cover comprising:

a cover for covering a motor of a lawn mower, said cover resting on a deck of said lawn mower;

a cord positioned over said cover for securing said cover to said lawn mower, opposite ends of said cord being attached to said deck of said lawn mower; and said cover including a fastening cord fixture for accepting and securing said cord and a slot for accommodating control wires running from said motor to an operating portion of said lawn mower, and a drainage lip forming a lower edge of said cover for collecting runoff and a spout for directing said runoff away from said lawn mower.

* * * * *